May 16, 1944.     E. F. MILLER     2,348,833
EXPANSION JOINT CONSTRUCTION
Filed Dec. 22, 1942
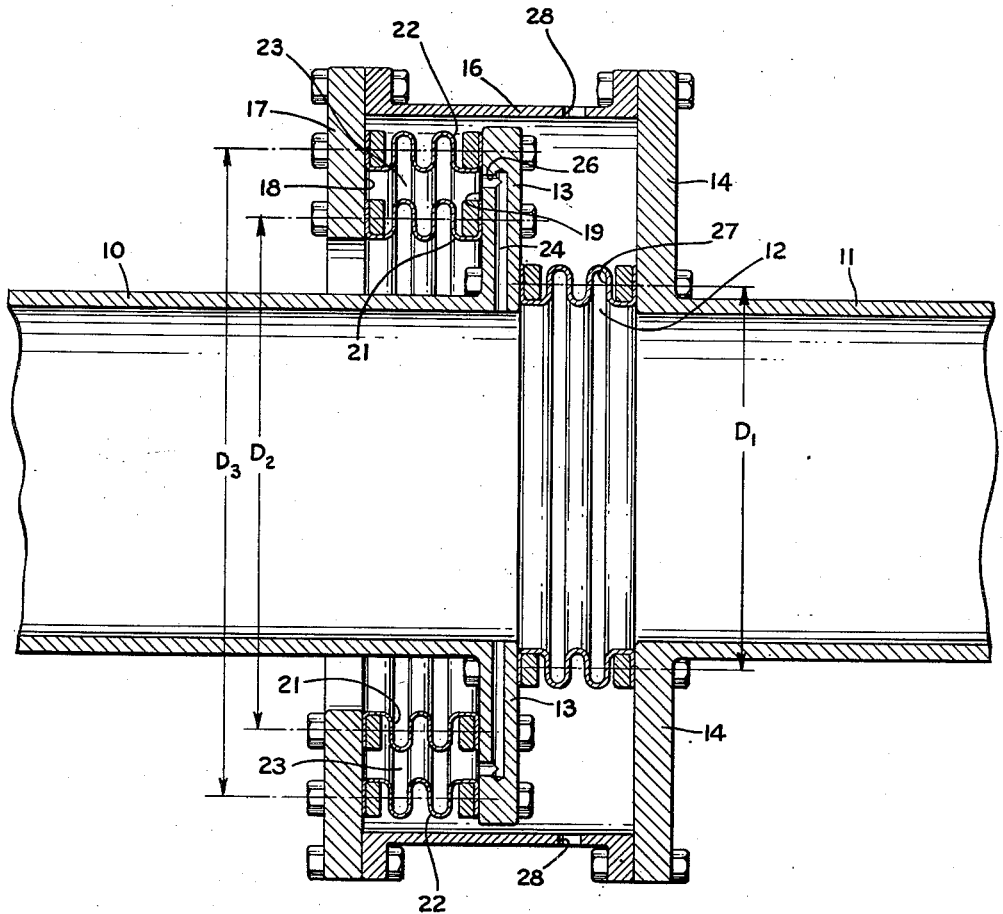
WITNESSES:
INVENTOR
ERNEST F. MILLER
BY
ATTORNEY Patented May 16, 1944

2,348,833

UNITED STATES PATENT OFFICE 2,348,833

EXPANSION JOINT CONSTRUCTION

Ernest F. Miller, Lansdowne, Pa., assignor to Westinghouse Electric & Manufacturing Company, East Pittsburgh, Pa., a corporation of Pennsylvania Application December 22, 1942, Serial No. 469,806

7 Claims. (Cl. 285—90)

This invention relates to expansion joints for that type of pipes or conduits which are subjected to internal pressure tending to force the sections of the pipe apart longitudinally, and has for an object the provision of such a joint so constructed as to balance this pressure and to permit the longitudinal movement necessitated by expansion, contraction, or other causes.

Yet another object of the invention is to provide a balanced expansion joint for a pipe line adapted to contain fluid under pressure, so constructed that there are no sliding joints subject to leakage of fluid therepast.

These and other objects are effected by the invention as will be apparent from the following description and claims taken in accordance with the accompanying drawing, forming a part of this application, in which the single figure is a longitudinal sectional view through an expansion joint construction embodying the features of the invention.

Referring now to the drawing more in detail, there is shown a pair of longitudinally-aligned pipe sections 10 and 11 having their adjacent ends spaced apart as at 12, said ends of the pipes having radial outwardly-extending flanges 13 and 14, respectively, integral therewith.

A sleeve-like member 16 is secured to and carried by the flange 14 on the pipe 11 and extends in overlying relation past the flange 13 on the pipe 10. A radially, inwardly-extending, flange-like member 17 is carried at the other end of the sleeve-like member 16 and, together with the flange 13, provides a pair of opposed faces 18 and 19, respectively.

A flexible inner annular corrugated expansion member 21 and a similar but larger outer expansion member 22 are positioned about the pipe 10, with their ends secured to the flanges 13 and 17 so as to be sealed with respect to the faces 18 and 19. Thus, there is provided between the inner and outer expansion members 21 and 22 an annular expansible pressure chamber 23 having its ends closed by the faces 18 and 19 of the flanges 17 and 13, respectively.

Connecting passages 24 and 26 formed in the flange 13 provide communication between the interior of the pipes 10 and 11 and the interior of the chamber 23, with the result that the latter is subject to the pressure existing in the pipes.

The space 12 between the adjacent ends of the pipes 10 and 11 is closed by a suitable flexible corrugated expansion member 27, and the sleeve-like member 16 serving to support the flange 17 from the flange 14 is provided with one or more openings 28 therethrough in order that the flexible expansion member 27 may be subject to atmospheric pressure at its outer side.

In order to provide an evenly balanced expansion joint, the inner and outer annular flexible expansion members 21 and 22 should be of such diameter that the annular area between the effective diameter $D_3$ of the outer expansion member and the effective diameter $D_2$ of the inner expansion member equals the effective circular area of diameter $D_1$ of the flexible expansion member 27. (From the formula $$(D_3^2 - D_2^2)\frac{\pi}{4} = D_1^2 \times \frac{\pi}{4} \text{ the } \frac{\pi\text{'s}}{4}$$

cancel and leave $D_3^2 - D_2^2 = D^2$.) With such a construction, it will be apparent that the effect of pressure within the pipes tending to separate adjacent ends of the latter is counteracted by the effect of the same pressure acting on the opposed faces 18 and 19 and tending to draw adjacent pipe ends together. The effective diameters of the bellows elements or expansion members are so chosen, as just pointed out, that the pipe separating force is effectively counterbalanced while preserving capability of the expansion joint to accommodate for relative pipe end movements.

While, in the embodiment herein illustrated, there is shown a solid sleeve-like member 28 for supporting the flange 17 from the flange 14, it will be apparent that any other suitable means may be provided, for example, circumferentially-spaced arms of a section similar to the section illustrated for the sleeve-like member. Also, it will be obvious to those skilled in the art that the means providing the flexible chamber 23 need not be limited to the corrugated members 21 and 22 herein shown, but may be constructed in any suitable manner, for example, by the use of flexible diaphragms, it being important only to provide a jointless construction whereby leakage of fluid is eliminated. Obviously, the same is true for the corrugated expansion member 27 connecting the adjacent ends of the pipes 10 and 11.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. Apparatus of the character described comprising first and second longitudinally-aligned pipes adapted to contain fluid under pressure and having their adjacent ends spaced apart, flanges integral with said ends, a flexible expansion element between said ends, a first annular member disposed about the first pipe in a plane radial thereto and spaced from the flange of said first pipe at the side thereof remote from the second pipe, means including a tension member for supporting said annular member from the flange of said second pipe, spaced inner and outer annular members providing flexible seals between said first annular member and the flange on the first pipe and defining therebetween an expansible pressure chamber, and means providing communication between the interiors of said chamber and said pipes, whereby the pressure within said chamber counteracts the pressure in said pipes tending to separate the adjacent ends thereof.

2. Apparatus of the character described comprising first and second longitudinally-aligned pipes adapted to contain fluid under pressure and having their adjacent ends spaced apart, a corrugated expansion element closing the space between said pipes, means providing a flexible expansion chamber externally of the pipes, means rigidly securing one end of the expansion chamber to one pipe and the other end to the other pipe, and means providing communication between the interior of the chamber and the interior of said pipes, whereby fluid pressure within the pressure chamber opposes the tendency of fluid pressure within the pipes to separate the latter.

3. Apparatus of the character described comprising first and second longitudinally-aligned conduits adapted to contain fluid under pressure and having their adjacent ends spaced apart; a flexible expansion member closing the space between said conduits; spaced inner and outer corrugated expansion elements concentrically positioned about the first conduit, said inner and outer elements being radially aligned and providing flexible walls extending axially of said first conduit; means secured to the first conduit and providing a wall closing the space between the inner and outer elements at the end thereof nearer the second conduit; means secured to the second conduit and including a tension member provided with a wall closing the space between the inner and outer elements at the end thereof more remote from said second conduit, the space thus enclosed constituting an expansion chamber whose end walls approach and recede from each other as the first and second conduits recede from and approach each other, respectively; and means providing communication between the interior of the conduits and the expansion chamber, whereby the effect of fluid pressure acting on the end walls of said chamber opposes that of fluid pressure in the conduits tending to separate the latter.

4. Apparatus of the character described comprising first and second longitudinally-aligned conduits adapted to contain fluid under pressure and having their adjacent ends spaced apart; a first corrugated flexible expansion member closing the space between the conduits; spaced second inner and third outer corrugated expansion members concentrically positioned about the first conduit, said inner and outer members being radially aligned and providing flexible walls extending axially of said first conduit; a flange extending radially outward from the end of the first conduit and providing a first wall closing one end of the space between said inner and outer members; a flange extending radially outward from the end of the second conduit; means carried by said last-mentioned flange and including a tension member provided with an annular radially-extending member forming a second wall closing the other end of said space between the inner and outer members, the space thus enclosed constituting an axially-expansible chamber whose end walls approach and recede from each other as the first and second conduits recede from and approach each other, respectively; and means providing communication between the interior of the conduits and the expansion chamber, whereby the effect of fluid pressure acting on the end walls of said chamber opposes that of fluid pressure in the conduits tending to separate the latter.

5. Structure as specified in claim 4, wherein $D_3^2 - D_2^2 = D_1^2$, where $D_3$ is the effective diameter of the third outer corrugated expansion member, $D_2$ is the effective diameter of the second inner corrugated expansion member, and $D_1$ is the effective diameter of the first corrugated expansion member.

6. Apparatus of the character described comprising first and second longitudinally-aligned conduits adapted to contain fluid under pressure and having their adjacent ends spaced apart, an enlarged portion on the first conduit forming an external annular shoulder; a sleeve-like member connected at one end to the second conduit and encircling said annular shoulder on the first conduit; an internal annular shoulder at the other end of said sleeve-like member and opposed to the first-mentioned annular shoulder; flexible inner and outer annular members extending from one annular shoulder to the other annular shoulder and providing therebetween an expansible pressure chamber; a flexible expansion member closing the space between the conduits; and means providing communication between the pressure chamber and the interior of the conduits, whereby the effect of fluid pressure within the conduits tending to separate the latter also is opposed by that in the chamber tending to separate the shoulders.

7. Structure as specified in claim 6, wherein the effective pressure area of the opposed annular shoulders is substantially equal to the effective pressure area of the conduits and the expansion member therebetween.

ERNEST F. MILLER.